United States Patent
Kim (10) Patent No.: US 7,589,935 B2
(45) Date of Patent: Sep. 15, 2009

(54) DISK CLAMPING APPARATUS FOR HARD DISK DRIVE AND HARD DISK DRIVE WITH THE SAME

(75) Inventor: Myung-il Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 10/997,988

(22) Filed: Nov. 29, 2004

(65) Prior Publication Data

US 2005/0162776 A1 Jul. 28, 2005

(30) Foreign Application Priority Data

Jan. 28, 2004 (KR) ...................... 10-2004-0005306

(51) Int. Cl.
*G11B 17/02* (2006.01)

(52) U.S. Cl. ................................. 360/99.12; 360/98.08

(58) Field of Classification Search ............. 360/98.08, 360/99.12, 99.05; 403/332, 375, DIG. 7; 411/353, 512, 517, 526; 24/621, 623; 279/89, 279/90, 93

See application file for complete search history.

(56) References Cited

U.S. PATENT DOCUMENTS

| | | | | | |
|---|---|---|---|---|---|
| 1,268,870 | A | * | 6/1918 | Moss ........................... | 24/623 |
| 1,890,348 | A | * | 12/1932 | Weatherhead, Jr. .......... | 411/352 |
| 2,855,206 | A | * | 10/1958 | Haviland .................... | 279/46.7 |
| 3,180,388 | A | * | 4/1965 | Newcomer, Jr. et al. ...... | 411/353 |
| 4,562,570 | A | * | 12/1985 | Denton ........................ | 720/709 |
| 4,627,288 | A | * | 12/1986 | Guzik et al. ................ | 73/432.1 |
| 4,834,603 | A | * | 5/1989 | Holton ........................ | 411/521 |
| 4,918,545 | A | * | 4/1990 | Scheffel ................... | 360/98.08 |
| 5,025,340 | A | * | 6/1991 | Peters ...................... | 360/99.12 |
| 5,243,481 | A | * | 9/1993 | Dunckley et al. ......... | 360/99.08 |
| 5,486,962 | A | * | 1/1996 | Boutaghou ................ | 360/99.12 |
| 5,590,004 | A | * | 12/1996 | Boutaghou ................ | 360/99.12 |
| 5,667,184 | A | * | 9/1997 | Nawa et al. .................. | 248/500 |
| 5,694,269 | A | * | 12/1997 | Lee ........................... | 360/98.08 |
| 5,712,746 | A | * | 1/1998 | Moir et al. ................ | 360/98.08 |

(Continued)

FOREIGN PATENT DOCUMENTS

JP 56-159878 12/1981

(Continued)

OTHER PUBLICATIONS

Office Action Issued by Korean Patent Office Aug. 29, 2005.

(Continued)

*Primary Examiner*—Brian E Miller
(74) *Attorney, Agent, or Firm*—Staas & Halsey LLP (57) ABSTRACT

A disk clamping apparatus and method for securing a data storage disk to a spindle motor of a hard disk drive. The disk clamping apparatus includes a flange formed on an outer periphery of a hub of the spindle motor and a clamp. The clamp is provided with a central hollow portion to receive an upper end portion of the hub, and includes a hook for snapping onto the flange along an inner periphery thereof and a pressing portion contacted with an upper surface of the disk for pressing the disk in a vertical direction along an outer periphery thereof. When the clamp is being coupled to the hub, the clamp is deformed so that the hook snaps on the flange, resulting in the pressing portion pressing the disk in the vertical direction, using a resilient force produced from a deformation of the clamp. The clamp further includes a cap formed around the hook to cover the hub. With this arrangement, the disk is stably secured to the spindle motor using a resilience force of the clamp, without using screws to clamp the disk to the spindle motor.

17 Claims, 7 Drawing Sheets

U.S. PATENT DOCUMENTS

| | | | | |
|---|---|---|---|---|
| 5,724,718 | A * | 3/1998 | Moir et al. | 29/603.03 |
| 5,732,458 | A * | 3/1998 | Moir et al. | 29/603.03 |
| 5,798,885 | A * | 8/1998 | Saiki et al. | 360/77.08 |
| 5,833,422 | A * | 11/1998 | Haga et al. | 411/526 |
| 5,920,959 | A * | 7/1999 | DeMarco | 16/257 |
| 6,040,649 | A * | 3/2000 | Horng | 310/91 |
| 6,339,516 | B1 * | 1/2002 | Martin et al. | 360/99.12 |
| 6,501,617 | B1 * | 12/2002 | Harada et al. | 360/99.08 |
| 6,563,668 | B1 | 5/2003 | Suwito | |
| 6,567,238 | B1 | 5/2003 | Renken et al. | |
| 6,703,584 | B2 * | 3/2004 | Church et al. | 219/121.85 |
| 6,705,813 | B2 * | 3/2004 | Schwab | 411/526 |
| 6,707,637 | B1 | 3/2004 | Codilian et al. | |
| 6,724,567 | B1 | 4/2004 | Kazmierczak et al. | |
| 6,757,132 | B1 | 6/2004 | Watson et al. | |
| 6,807,721 | B2 * | 10/2004 | Choo et al. | 29/603.03 |
| 6,816,338 | B1 | 11/2004 | Suwito | |
| 6,967,814 | B1 | 11/2005 | Chessman et al. | |
| 7,085,098 | B1 | 8/2006 | Yang et al. | |
| 2002/0069509 | A1 * | 6/2002 | Choo et al. | 29/603.03 |
| 2002/0071206 | A1 * | 6/2002 | Choo et al. | 360/99.12 |
| 2003/0214751 | A1 | 11/2003 | Hanssen | |
| 2004/0032691 | A1 * | 2/2004 | Drake et al. | 360/99.12 |
| 2005/0185330 | A1 * | 8/2005 | Lee et al. | 360/99.12 |

FOREIGN PATENT DOCUMENTS

| | | |
|---|---|---|
| JP | 2-2922876 | 12/1990 |
| JP | 03-183057 | 8/1991 |
| JP | 04-195958 | 7/1992 |
| JP | 06-119697 | 4/1994 |
| JP | 94-6610 | 4/1994 |
| JP | 7-6469 | 1/1995 |
| JP | 7-220351 | 8/1995 |
| JP | 07-262748 | 10/1995 |
| JP | 8-321107 | 12/1996 |
| JP | 08-321107 | 12/1996 |
| JP | 08-321108 | 12/1996 |
| JP | 8-339597 | 12/1996 |
| JP | 09-115216 | 5/1997 |
| JP | 2003-6970 | 1/2003 |
| JP | 2003-338102 | 11/2003 |

OTHER PUBLICATIONS

U.S. Appl. No. 11/138,270, filed May 27, 2005, Chul-woo Lee et al., Samsung Electrons Co., Ltd.

* cited by examiner

DISK CLAMPING APPARATUS FOR HARD DISK DRIVE AND HARD DISK DRIVE WITH THE SAME

CROSS-REFERENCE TO RELATED APPLICATIONS

This application claims the priority benefit of Korean Patent Application No. 2004-5306, filed on Jan. 28, 2004, in the Korean Intellectual Property Office, the disclosure of which is incorporated herein in its entirety by reference.

BACKGROUND OF THE INVENTION

1. Field of the Invention

The present invention relates to a hard disk drive, and more particularly, to a hard disk drive with a disk clamping apparatus to secure a data storage disk to a spindle motor.

2. Description of the Related Art

A hard disk drive reads data from and/or writes data to a disk by using a read/write head. During the reading and writing operations, the head is shifted to a desired position on the surface of the disk by an actuator, while flying over the recording surface of the spinning disk at a proper height.

Figure 1:
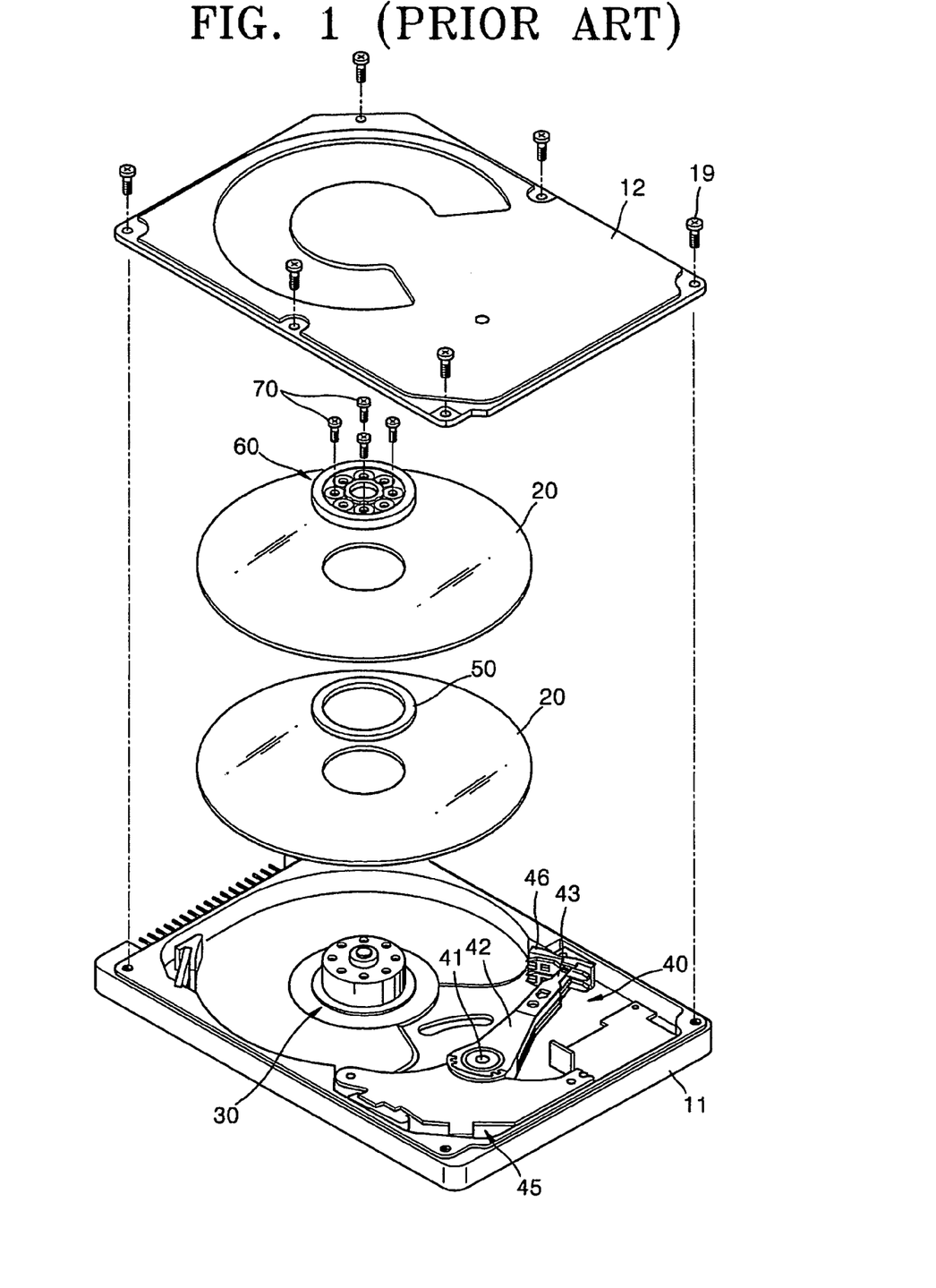
FIG. 1 illustrates an exploded perspective view of a conventional hard disk drive.

FIG. 1 is an exploded perspective view illustrating one example of a conventional hard disk drive.

Referring to FIG. 1, the hard disk drive includes a base member 11, a spindle motor 30 mounted to the base member 11 for rotating a disk 20, which is a storage medium for storing data, and an actuator 40 for moving a read/write head to a desired position on the disk 20.

The spindle motor 30 is installed to the base member 11. The spindle motor 30 may be provided with two disks, as illustrated in FIG. 1, or may be provided with one or more disks. In the case where a plurality of disks are mounted to the spindle motor 30, a ring-shaped spacer 50 is positioned between each disk 20 to maintain a distance between the disks 20. A clamp 60 is engaged to an upper end of the spindle motor 30 by use of screws 70 to rigidly secure the disk 20 to the spindle motor 30.

The actuator 40 includes a swing arm 42, rotatably coupled to a pivot bearing 41 installed on the base member 11, a suspension 43 installed on one end portion of the swing arm 42 for supporting and elastically biasing a slider (not shown), on which the head is mounted, toward the surface of the disk 20, and a voice coil motor (VCM) 45 for rotating the swing arm 42. The voice coil motor 45 is controlled by a servo control system. The swing arm 42 is rotated in a direction according to the Fleming's left-hand rule by the interaction between an electric current input to a VCM coil and a magnetic field generated by magnets. Specifically, when the disk 20 starts spinning, upon the hard disk drive being turned on, the voice coil motor 45 rotates the swing arm 42 in a counterclockwise direction to move the head to a desired position on a recording surface of the disk 20. On the contrary, when the disk 20 stops spinning, upon the hard disk drive being turned off, the voice coil motor 45 rotates the swing arm 42 in a clockwise direction to move the head away from the disk 20. At this time, the head deviating from the recording surface of the disk 20 is parked on a ramp 46 provided outside of the disk 20.

A cover member 12 is assembled to the upper portion of the base member 11, using a plurality of screws 19. The disk 20, the spindle motor 30 and the actuator 40 are enclosed and protected by the base member 11 and the cover member 12 coupled to each other.

A conventional coupling structure of the spindle motor 30, the disk 20 and the clamp 60 will now be described with reference to FIGS. 2 and 3.

Figure 2:
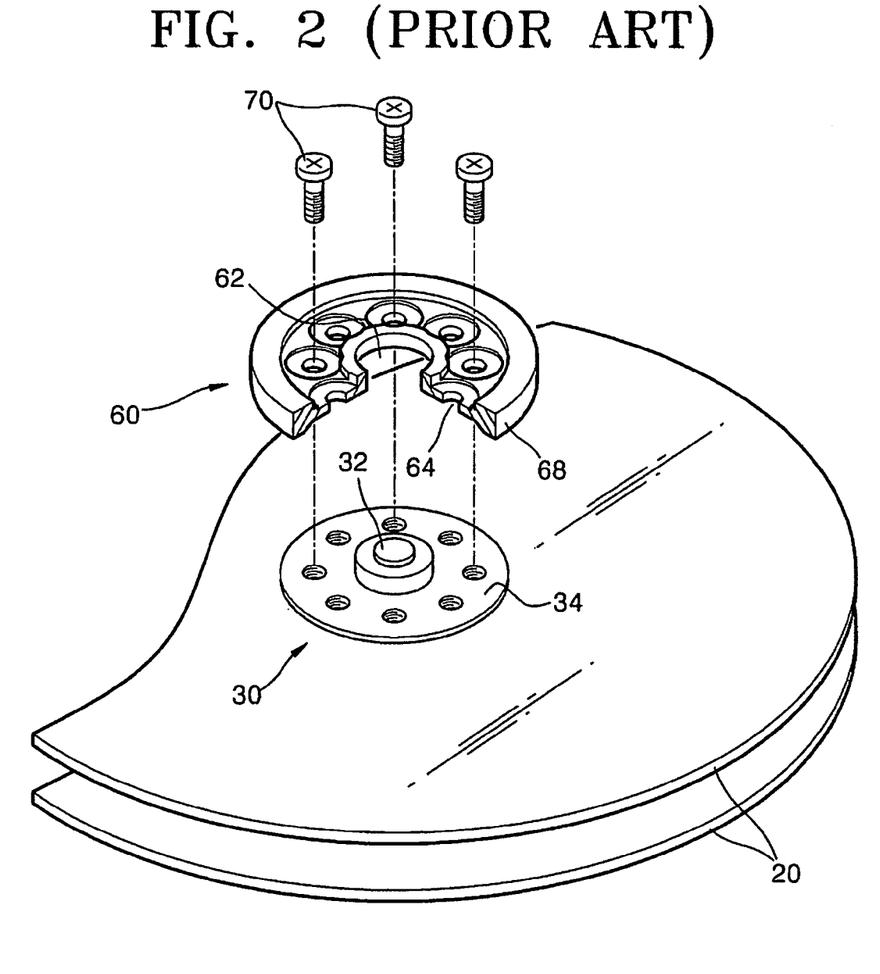
FIG. 2 illustrates an enlarged perspective view of a clamping portion of the conventional hard disk drive in FIG. 1.
Figure 3:
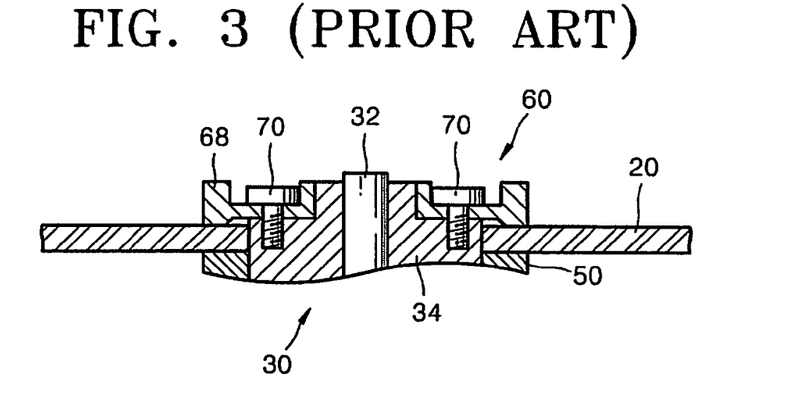
FIG. 3 is a cross-sectional view illustrating a conventional clamp, shown in FIG. 2, being coupled to a spindle motor.

FIG. 2 is an enlarged perspective view illustrating a clamping portion of a conventional hard disk drive in FIG. 1, and FIG. 3 is a cross-sectional view illustrating a state where a conventional clamp shown in FIG. 2 is coupled to a spindle motor.

Referring to FIGS. 2 and 3, a shaft 32 is generally fixed to the spindle motor 30, and a hub 34 is rotatably installed to the shaft 32 of the spindle motor 30. The disk 20 is mounted around an outer periphery of the hub 34. In the case where a plurality of disks are mounted to the spindle motor 30, a ring-shaped spacer 50 is installed around the outer periphery of the hub 34 to maintain a distance between the disks. The clamp 60 is generally engaged to an upper end of the hub 34, using four or six screws 70. The clamp 60 is provided at a center portion thereof, with a hollow portion 62, and a plurality of screw-receiving holes 64 around the hollow portion 62 at constant intervals from the hollow portion 62. The clamp 60 is also provided along an outer edge thereof, with a pressing portion 68 for pressing the upper surface of the disk 20 in a vertical direction.

In this conventional hard disk drive, the operation of writing the data on the disk and reading the data from the disk is achieved by a read/write head on a rapidly spinning disk 20, with the read/write head flying on the disk at very small intervals. The inherently poor smoothness of the disk 20, or the poor smoothness of the disk 20 acquired during the fastening the clamp 60, is a major reason for generating error signals when the head writes data on the disk 20 or reads data from the disk 20. In particular, the smoothness defect of the disk 20, acquired from the fastening the clamp 60, is a result of a non-uniform distribution of stress applied to the disk 20 through the plurality of screws 70.

Figure 4:
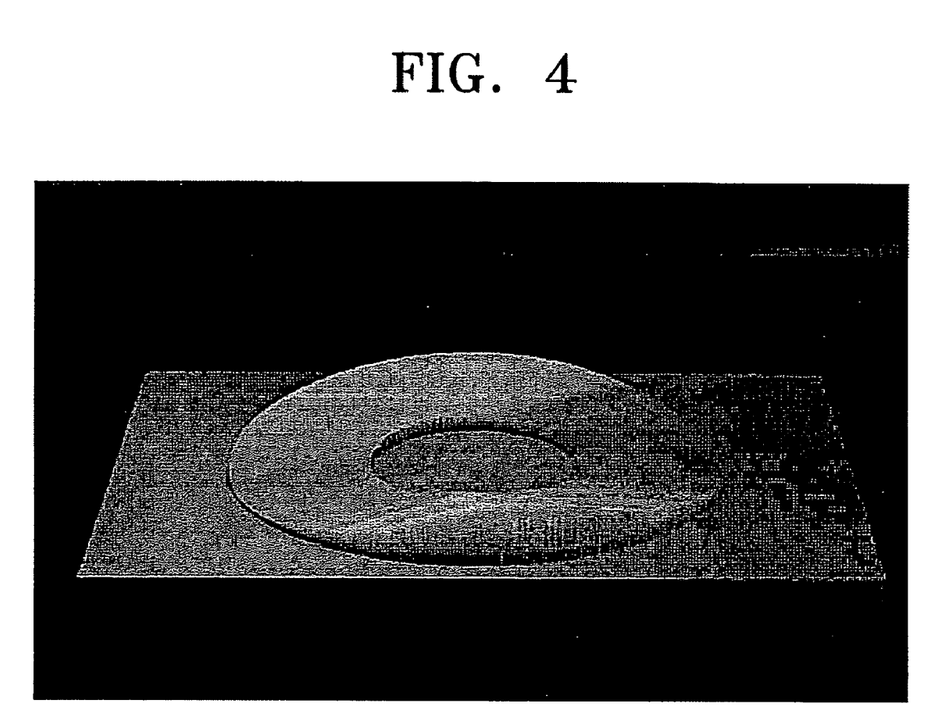
FIG. 4 is a photograph depicting a disk bent by the conventional clamp shown in FIG. 1.

Specifically, when the clamp 60 is fastened to the spindle motor 30, using the plurality of screws 70, a pressing force acts on the disk 20 by the pressing portion 68 of the clamp 60. Even though the plurality of screws 70 are tightened with a precise torque, the torque applied to the respective screws 70 cannot be completely equal. Therefore, the pressing force applied to the disk 20 is not radially uniform, and hence, the disk 20 can become bent, as illustrated in FIG. 4, thereby deteriorating the smoothness of the disk 20.

Meanwhile, if the pressing force applied to the disk 20 is week, by tightening the screws 70 with insufficient torque, the disk 20 may slip when an external shock is applied to the hard disk drive. A slipping of the disk 20 causes the data to be recorded in a position away from a center line of a track. Accordingly, the head cannot search its original stored position or cannot serve to normally write and read the data.

In addition, since the clamp 60 is secured to the hub 34 of the spindle motor 30 by way of a plurality of screws 70, a lot of time is required to fasten the multiple screws 70. Also, the multiple screws 70 are fastened to the hub 34 of the spindle motor 30 by use of an electric driver. During this fastening, fine metal particles are generated due to friction between metals of the screws and the hub 34. These metal particles can cause a scratch to form on the surface of the disks 20 or the head to be damaged, thereby reducing the effectiveness of the writing/reading to/from the disk 20.

Various studies have been developed to solve the above problems. One example is disclosed in Japanese Patent Laid-Open Publication No. 2003-6970, where a disk is secured to a spindle motor by way of a clamp, without using a screw. An inner periphery of the clamp contacts a hub of the spindle motor with a sufficient resilient force to maintain a clamping state of the disk. However, the clamp does not mechanically prevent the disks from being separated. Accordingly, an inner periphery of the clamp can be lifted from its original position due to an external shock or vibration. In this case, a pressing force applied to the disks may be attenuated. Thus, in this method, there are disadvantages in that the clamp may secede from the hub, when the repeated external shock or vibration is repeatedly applied to the hard disk drive. In addition, it is difficult to manufacture the clamp since the clamp can be complicated.

SUMMARY OF THE INVENTION

The present invention provides a disk clamping apparatus and method for a hard disk drive capable of firmly securing a disk to a spindle motor, without utilizing screws.

Additional aspects and/or advantages of the invention will be set forth in part in the description which follows and, in part, will be obvious from the description, or may be learned by practice of the invention.

To achieve the above and/or other aspects and advantages, embodiments of the present invention sets forth a disk clamping apparatus for securing a data storage disk to a spindle motor of a hard disk drive, including a flange along an outer periphery of a hub of the spindle motor, and a clamp, having a hollow portion in a center of the clamp, to engage an upper end portion of the hub, and including a hook for snapping onto the flange along an inner periphery of the flange and a pressing portion, along an outer periphery of the clamp, to contact with an upper surface of the disk for pressing the disk in a vertical direction, wherein when the clamp is coupled to the hub a deformation of the clamp snaps the hook onto the flange and the pressing portion presses the disk in the vertical direction using a resilient force generated from the deformation of the clamp.

The clamp further may include a cap formed around the hook and covering the hub. Further, the cap may have a diameter gradually increased toward an upper portion, away from the pressing portion, thereof. The cap may also include a centrally located screw-receiving hole for receiving a screw to fix a shaft of the spindle motor to a cover member of the hard disk drive.

The clamp may include a plurality of slots radially extending along an inner periphery of the clamp at regular intervals, with the slots being arranged in a circumferential direction.

The clamp may have a convex shape, with an upper portion of the clamp being swollen upward from the outer periphery to the inner periphery of the clamp, and wherein a vertical height between an upper end portion of the hook and a surface of the pressing portion, to be contacted with the disk, becomes reduced when the clamp is deformed. Further, a chamfer is formed on an upper edge of the flange. The flange may be ring shape along an outer periphery of the hub at an upper end of the hub, the hook and the pressing portion may be ring shaped along the inner and outer peripheries of the clamp, respectively, and the clamp may be made of metal having a desired resilience, e.g., stainless steel.

To achieve the above and/or other aspects and advantages, embodiments of the present invention sets forth a disk drive, including a spindle motor having a hub with a engaging element along an outer periphery of the hub, a head for reading and/or writing from/to a disk, and a clamp for securing the disk to the spindle motor, with the clamp engaging the engaging element of the hub and contacting with an upper surface of the disk to press the disk in a vertical direction, such that when the clamp is coupled to the hub a deformation of the clamp engages the clamp with the engaging element and a pressing portion presses the disk in the vertical direction using a resilient force generated from the deformation of the clamp.

The clamp may further include a hook for snapping onto a flange on the hub along an inner periphery of the flange and a pressing portion, along an outer periphery of the clamp, with the flange being the engaging element.

The clamp may further include a cap covering the hub, wherein the cap may have a diameter gradually increased toward an upper portion, away from the pressing portion, thereof. The cap may further include a centrally located screw-receiving hole for receiving a screw to fix a shaft of the spindle motor to a cover member of the hard disk drive.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. The embodiments are described below to explain the present invention by referring to the figures.

Figure 5:
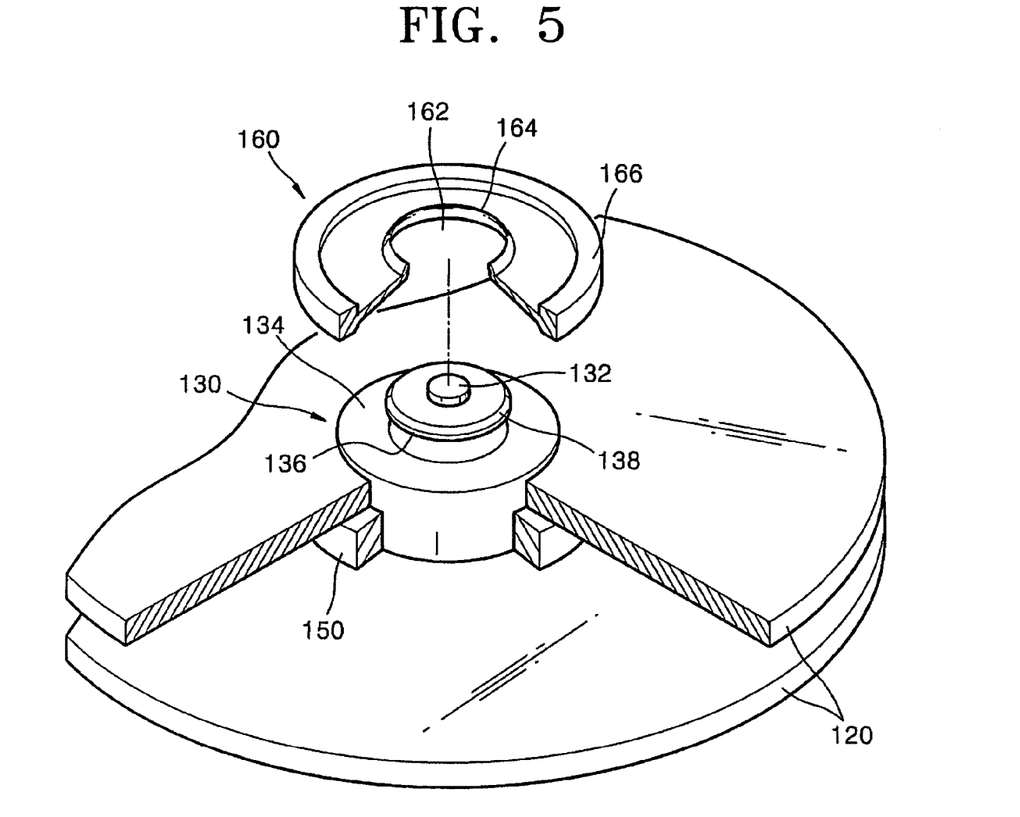
FIG. 5 illustrates an exploded perspective view of a disk clamping apparatus for a hard disk drive, according an embodiment of the present invention.
Figure 6A:
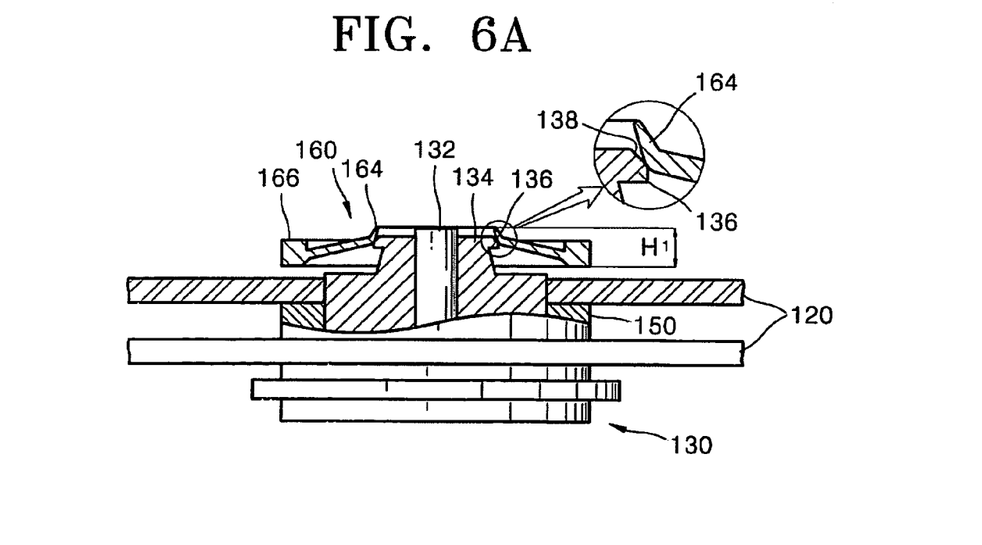
FIG. 6A illustrates a partially cross-sectional view of a hub of a spindle motor before the clamp, shown in FIG. 5, is engaged to the hub of the spindle motor.
Figure 6B:
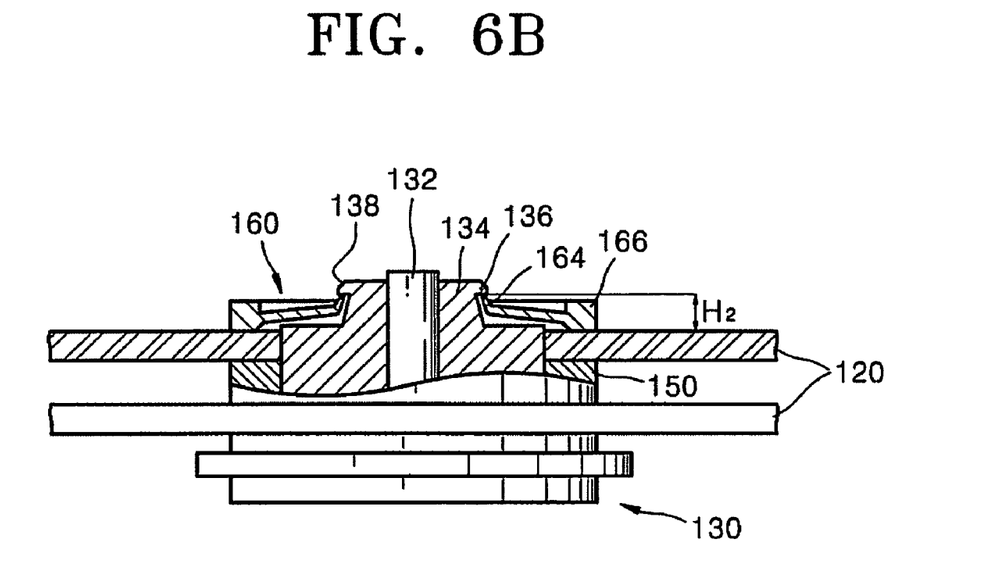
FIG. 6B illustrates a partially cross-sectional view illustrating the hub of the spindle motor after the clamp, shown in FIG. 5, is engaged to the hub of the spindle motor.

FIG. 5 illustrates an exploded perspective view of a disk clamping apparatus for a hard disk drive, according an embodiment of the present invention. FIG. 6A illustrates a partially cross-sectional view of a hub and spindle motor before the clamp, shown in FIG. 5, is engaged to the hub of the spindle motor. FIG. 6B illustrates a partially cross-sectional view of the hub and spindle motor after the clamp, shown in FIG. 5, is engaged to the hub of the spindle motor.

Referring to the embodiment illustrated in FIGS. 5 and 6A, the hard disk drive includes at least one disk 120, which is a storage medium for storing data, and a spindle motor 130 for rotating the disk 120. A hub 134 is rotatably installed onto a shaft 132 of the spindle motor 130, and the disk 120 is mounted around an outer periphery of the hub 134 of the spindle motor 130. When a plurality of disks 120 are mounted onto the spindle motor 130, a ring-shaped spacer 150 is installed around the hub 134 to maintain a distance between the disks 120.

The spindle motor 130 includes a clamping portion provided on an upper end of the spindle motor 130 to firmly secure the disk 120 to the spindle motor 130. The clamping portion includes a flange 136 formed on an outer periphery of the hub 134 of the spindle motor 130, and a clamp 160 coupled to the hub 134 for pressing the disk 120 in the illustrated vertical direction.

The flange 136 is formed in a ring shape along the outer periphery of the hub 134, at an upper end of the hub 134. A chamfer 138 may be formed on an upper edge of the flange 136. The chamfer 138 serves to help easily insert the clamp 160 into the hub 134, as described below.

The clamp 160 is formed with a hollow portion 162, located in the center of the clamp, to receive the upper end portion of the hub 134. The clamp 160 is provided on an inner periphery thereof with a hook 164, snapping on the flange 136 of the hub 134, and on an outer periphery thereof with a pressing portion 166, contacted the upper surface of the disk 120 to press the disk 120 in the illustrated vertical direction.

The hook 164 is formed in a ring shape along the inner periphery of the clamp 160, and has an inner diameter slightly smaller than an outer diameter of the flange 136. When the clamp 160 engages the hub 134, the hook 164 contacts, in a snapping motion, with the flange 136 formed on the outer periphery of the hub 134. At this time, the entire upper end portion of the hook 164 contacts the flange 136, so that a pressing force can be uniformly applied to the clamp 160.

The pressing portion 166 is formed in a ring shape along the outer periphery of the clamp 160. When the clamp 160 is coupled to the hub 134, a bottom surface of the pressing portion 166 contacts the upper surface of the disk 120 to press the disk 120 in the vertical direction. The entire bottom surface of the pressing portion 166 contacts the upper surface of the disk 120, so that a more uniform pressing force can be circumferentially applied to the disk 120.

The clamp 160 may be made of metal having desired resilience, such as stainless steel, to generate a resilient force due to its deformation.

As shown in FIG. 6A, the clamp 160 has a convex shape, with an upper portion being swollen from the outer periphery to the inner periphery of the clamp. Accordingly, a first vertical height $H_1$ is formed between the upper end portion of the hook 164 and the bottom surface of the pressing portion 166, i.e., the surface in contact with the disk 120. When the clamp 160 is coupled to the hub 134, the first vertical height $H_1$ retracts to a second vertical height $H_2$ due to the deformation of the clamp 160, as shown in FIG. 6B. The deformation of the clamp 160 generates a resilient force, and the pressing portion 166 presses the disk 120 in the vertical direction with the resilient force.

Specifically, the clamp 160 is positioned on the upper end portion of the hub 134, as shown in FIG. 6A. Then, the bottom surface of the hook 164 of the clamp 160 contacts the upper edge of the flange 136, i.e., the chamfer 138. At this time, the first vertical height $H_1$ is maintained between the upper end portion of the hook 164 and the bottom surface of the pressing portion 166, while the bottom surface of the pressing portion 166 is positioned on the upper surface of the disk 120 at a desired interval. Meanwhile, although the bottom surface of the pressing portion 166 may contact the upper surface of the disk 120, at the height $H_1$ the pressing portion 166 does not press the disk 120 in the vertical direction.

As shown in FIG. 6B, when the clamp 160 is pressed down, the clamp 160 becomes resiliently deformed. The hook 164 engages the flange 136, and the pressing portion 166 becomes tightly contacted with the upper surface of the disk 120. At this time, since the chamfer 138 is formed on the upper edge of the flange 136, the clamp 160 is easily inserted into the hub 134. The first vertical height $H_1$ between the upper end portion of the hook 164 and the bottom surface of the pressing portion 166 retracts to the second vertical height $H_2$, thereby generating the resilient force. The resilient force serves as a pressing force to press the disk 120 in the vertical direction by use of the pressing portion 166. Since the entire bottom surface of the pressing portion 166 is in close contact with the upper surface of the disk 120, in the circumferential direction, the pressing force applied to the disk 120 is more uniformly distributed over the entire contacted surface of the disk 120. Accordingly, the conventional bending problem of the disk 120, due to the non-uniform distribution of the pressing force, can be minimized, thereby improving the smoothness of the disk 120.

According an embodiment of the present invention, the disk 120 can be firmly secured to the spindle motor 130 by use of the resiliently deformed clamp 160. Because the use of screws is no longer needed, disk 120 and the head can be prevented from being damaged due to metal particles produced when fastening the screws. In addition, implementation of invention does not require fastening time for the screws, thereby simplifying a clamping operation of the disk 120 during manufacture.

In addition, the hook 164 of the clamp 160 engages the flange 136, formed on the outer periphery of the hub 134. Accordingly, a sufficient pressing force can be applied to the disk 120, thereby preventing slipping of the disk 120. Also, the clamp 160 will not separate from the hub 134 of the spindle motor 130, when the external shock or vibration is repeatedly applied to the hard disk drive, so that the pressing force applied to the disk 120 can be stably maintained.

Figure 7:
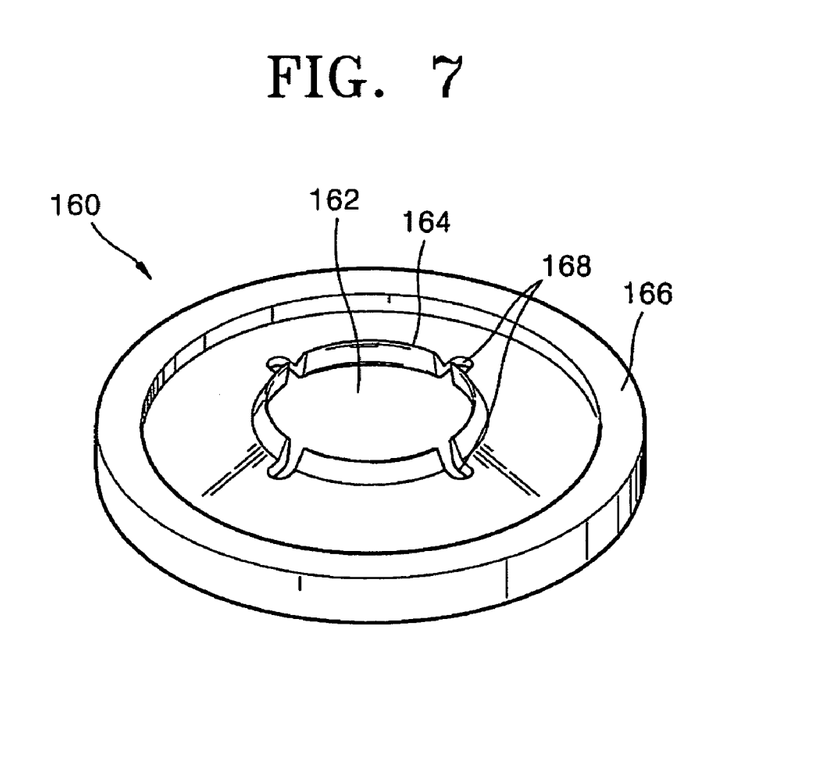
FIG. 7 illustrates a perspective view of another embodiment of a disk clamping apparatus.

FIG. 7 is a perspective view of an alternative embodiment of the clamp in FIG. 5.

Referring to FIG. 7, the clamp 160 may be formed with a plurality of slots 168 radially extended along the inner periphery thereof at regular intervals. As such, the hook 164 formed on the inner periphery of the clamp 160 can be segmented into portions, by the slots 168. If the hook 164 is segmented by the slots 168, the hook 164 can be easily and resiliently deformed, so that the clamp 160 is easily inserted into the hub 134.

Figure 8:
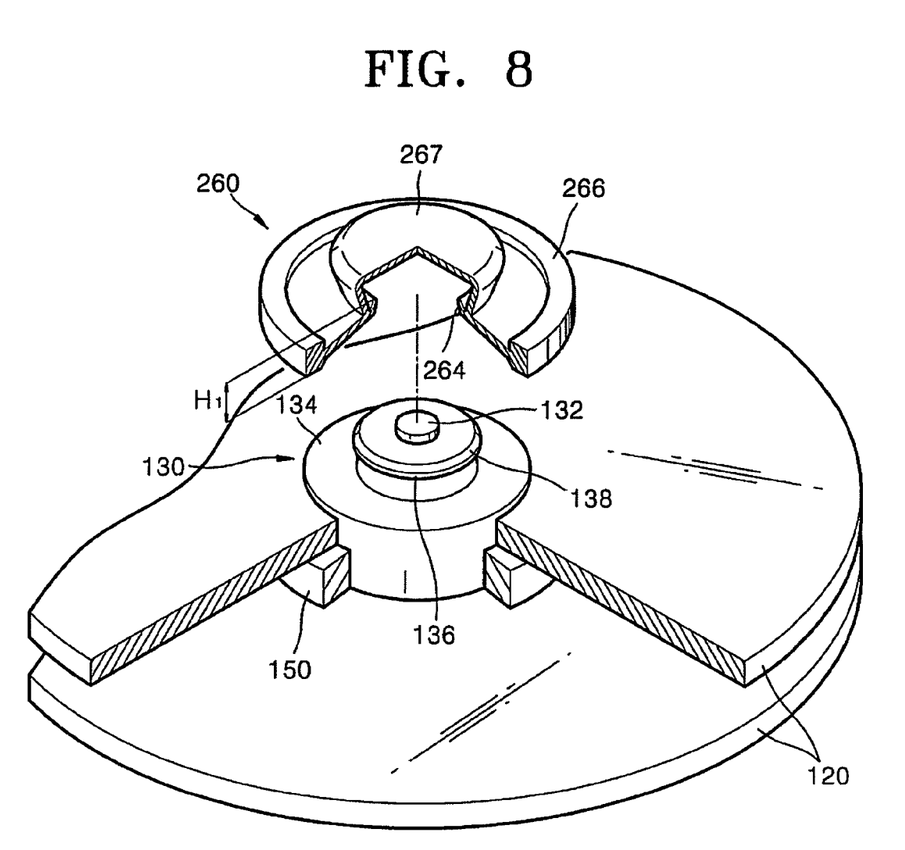
FIG. 8 illustrates an exploded perspective view of another disk clamping apparatus for a hard disk drive, according to another embodiment of the present invention.
Figure 9:
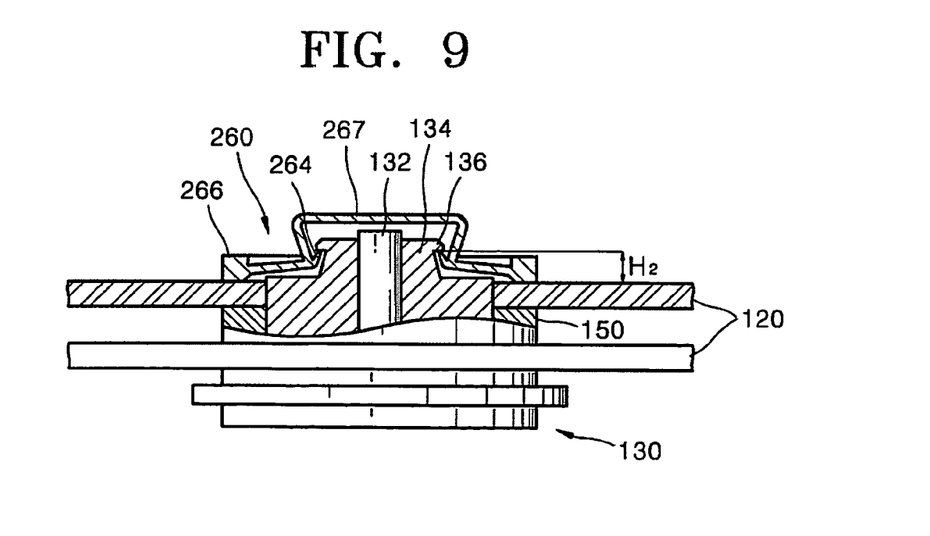
FIG. 9 illustrates a partially cross-sectional view of the clamp, shown in FIG. 8, being engaged to the hub of spindle motor.

FIG. 8 is an exploded perspective view illustrating a disk clamping apparatus for a hard disk drive according to another embodiment of the present invention. FIG. 9 is a partially cross-sectional view illustrating a state where the clamp in FIG. 8 is engaged to a hub of a spindle motor.

The clamping apparatus according to this embodiment includes a flange 136 formed on an outer periphery of the hub 134 of the spindle motor 130, and a clamp 260 coupled to the hub 134 for pressing the disk 120 in a vertical direction. The clamp 260 is formed with a hollow portion 262, in a center of the clamp 260, to receive the upper end portion of the hub 134. The clamp 260 is thereby provided with an inner periphery hook 264 for snapping with the flange 136 of the hub 134 and an outer periphery pressing portion 266 contacting with the upper surface of the disk 120, to press the disk 120 in a vertical direction. Preferably, though not necessary, a chamfer 138 is formed on an upper edge of the flange 136. Detailed configuration and operation of these components are similar to those of the above embodiment, the description of which will be omitted.

According to this embodiment, the clamp 260 further includes a cap 267 formed around the hook 264 for covering the upper end portion hub 134. Preferably, the cap 267 has a diameter gradually increased toward an upper portion thereof. Such a cap 267 causes the clamp 260 to easily engage the hub 134. Specifically, as the cap 267 is pressed down, a lower end portion of the cap becomes widened, so that an inner diameter of the hook 264 formed on the lower end portion becomes widened to easily insert the clamp 260 onto the hub 134. Then, if the force pressing the cap 267 down is released, the lower end portion of the cap contracts, so that the hook 264 snaps on the flange 136 formed on the outer periphery of the hub 134. At this time, a first vertical height $H_1$ between the upper end portion of the hook 264 and the bottom surface of the pressing portion 266 retracts to a second vertical height $H_2$ to generate a resilient force. The pressing portion 266 presses the disk 120 in the vertical direction with the resilient force.

Meanwhile, conventionally, when the cover member (indicated by element 12 in FIG. 1) of the hard disk drive is deformed due to the external shock and then contacts the upper end portion of the hub 134 and the shaft 132, the impact load may be directly applied to the spindle motor 130, thereby damaging the spindle motor 130. However, since the cap 267 is formed on the clamp 260, covering the upper end portion of the hub 134, the cover member will not contact the hub 134 and the shaft 132, thereby preventing the spindle motor 130 from being damaged. In addition, the cap 267 prevents particles from entering into the spindle motor 130 and polluting the spindle motor 130.

Figure 10:
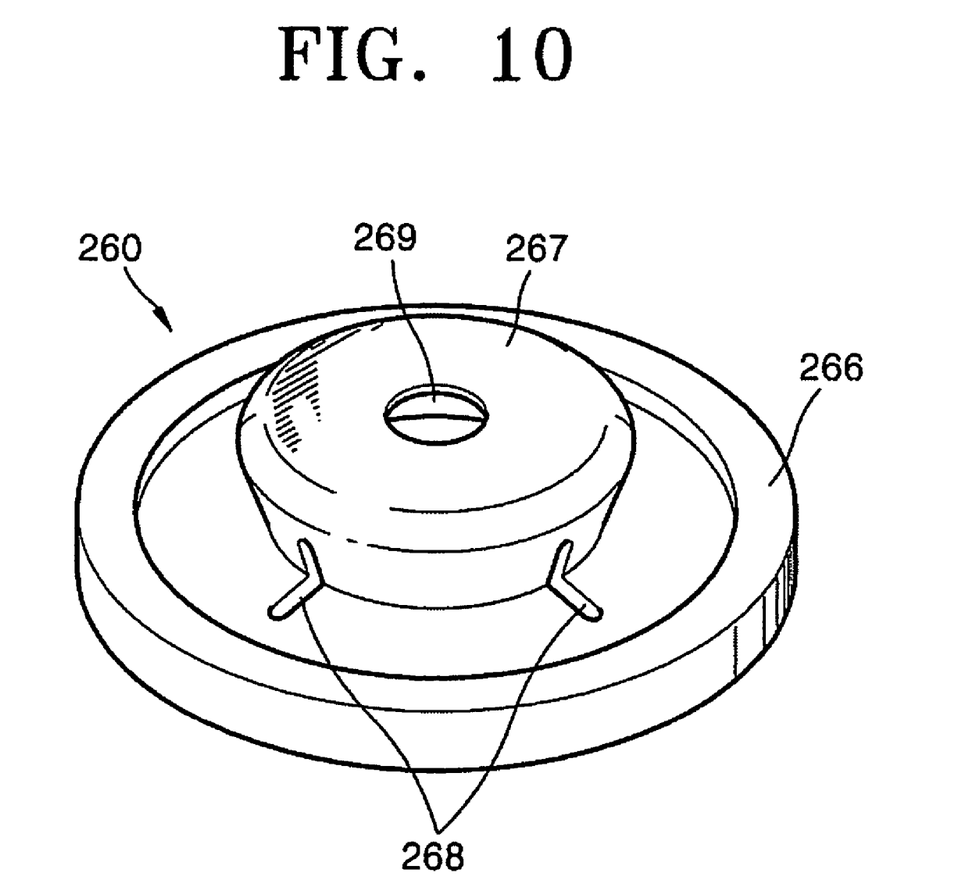
FIG. 10 illustrates a perspective view of an alternative embodiment of the clamp shown in FIG. 8.

FIG. 10 is a perspective view of an alternative embodiment of the clamp in FIG. 8.

Similar to above, referring to FIG. 10, the clamp 260 may be formed with a plurality of slots 268 radially extended in a desired length on the inner periphery thereof at regular intervals. The slots 268 extend a desired length toward the upper end portion of the cap 267, as well as the pressing portion 266. As such, the hook 264 formed on the inner periphery of the clamp 260 becomes segmented into portions by the slots 268. If the hook 264 is segmented by the slots 268, the hook can be easily and resiliently deformed, so that the clamp 260 can be easily inserted onto the hub 234.

Meanwhile, when utilizing a hydro-dynamic pressure bearing in the spindle motor 130, it is not necessary to fix the shaft 132 of the spindle motor 130. In the case of utilizing a general ball bearing, however, the shaft 132 has to be fixed so as to prevent swing of the shaft 132. In the latter, the shaft 132 is fixed to the cover member (indicated by element 12 in FIG. 1) of the hard disk drive by way of screws (not shown). To this end, the cap 267 may be formed with screw-receiving holes 269 to receive the screws at a center of the cap 267.

With the above description, according to the disk clamping apparatus and method of the present invention, it is possible to firmly secure a disk to a spindle motor without utilizing screws. Therefore, the disk and the head can be prevented from being damaged due to metal particles produced from screw fastening. In addition, disk fastening time is eliminated, thereby simplifying a clamping operation of the disk during manufacture.

The resilient force of the clamp serves as a pressing force to press the disk through an outer periphery of the clamp. Thus, the pressing force can be uniformly distributed over the entire circumferential direction of the disk, thereby minimizing bending of the disk and improving smoothness of the disk.

In addition, the hook formed on the inner periphery of the clamp can engage the flange formed on the outer periphery of the hub of the spindle motor. Accordingly, a sufficient pressing force may be applied to the disk, thereby preventing slipping of the disk. Also, the clamp will not separate from the hub of the spindle motor when an external shock or vibration is repeatedly applied to the hard disk drive, such that the pressing force applied to the disk can be stably maintained. Also, since a cap is formed in the clamp, covering the upper end portion of the hub, the clamp can be easily coupled to the hub. Particles will not invade into the spindle motor through the cap. The cover member will also not contact the shaft by the cap when an external shock is applied, thereby preventing the spindle motor from being damaged.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk clamping apparatus for securing a data storage disk to a spindle motor of a hard disk drive, comprising:
   A hub body including a flange along an outer periphery of the hub of the spindle motor; and
   a clamp, having a hollow portion in a center of the clamp, to engage an upper end portion of the hub, and including a hook for snapping onto the flange along an inner periphery of the flange and a pressing portion, along an outer periphery of the clamp, to contact with an upper surface of the disk for pressing the disk in a vertical direction,
   wherein when the clamp is coupled to the hub a deformation of the clamp snaps the hook onto the flange and the pressing portion presses the disk in the vertical direction using a resilient force generated from the deformation of the clamp,
   wherein the clamp further comprises a cap formed around the hook and covering a top of the hub.

2. The disk clamping apparatus of claim 1, wherein the cap has a diameter gradually increased toward an upper portion, away from the pressing portion, thereof.

3. The disk clamping apparatus of claim 1, wherein the cap comprises a centrally located screw-receiving hole for receiving a screw to fix a shaft of the spindle motor to a cover member of the hard disk drive.

4. The disk clamping apparatus of claim 1, wherein the clamp comprises a plurality of slots radially extending along an inner periphery of the clamp at regular intervals, with the slots being arranged in a circumferential direction.

5. The disk clamping apparatus of claim 1, wherein the clamp has a convex shape, with an upper portion of the clamp being swollen upward from the outer periphery to the inner periphery of the clamp, and wherein a vertical height between an upper end portion of the hook and a surface of the pressing portion, to be contacted with the disk, becomes reduced when the clamp is deformed.

6. The disk clamping apparatus of claim 1, wherein a chamfer is formed on an upper edge of the flange.

7. The disk clamping apparatus of claim 1, wherein the flange is ring shape along an outer periphery of the hub at an upper end of the hub.

8. The disk clamping apparatus of claim 1, wherein the hook and the pressing portion are ring shaped along the inner and outer peripheries of the clamp, respectively.

9. The disk clamping apparatus of claim 1, wherein the clamp is made of metal having a desired resilience.

10. The disk clamping apparatus of claim 9, wherein the clamp is made of stainless steel.

11. A disk drive, comprising:
a spindle motor having a hub body including a engaging element along an outer periphery of the hub;
a disk for recording information;
a head for reading and/or writing from/to the disk; and
a clamp securing the disk to the spindle motor, with an element of the clamp engaging the engaging element of the hub and contacting with an upper surface of the disk to press the disk in a vertical direction, such that when the clamp is coupled to the hub a deformation of the clamp engages the clamp with the engaging element and a pressing portion presses the disk in the vertical direction using a resilient force generated from the deformation of the clamp,
wherein the clamp further comprises a hook for snapping onto a flange on the hub along an inner periphery of the flange and the pressing portion, along an outer periphery of the clamp, with the flange being the engaging element,
wherein the clamp further comprises a cap covering a top of the hub.

12. The disk drive of claim 11, wherein the cap has a diameter gradually increased toward an upper portion, away from the pressing portion, thereof.

13. The disk drive of claim 11, wherein the cap comprises a centrally located screw-receiving hole for receiving a screw to fix a shaft of the spindle motor to a cover member of the hard disk drive.

14. The disk drive of claim 11, wherein the clamp comprises a plurality of slots radially extending along an inner periphery of the clamp at regular intervals, with the slots being arranged in a circumferential direction.

15. The disk drive of claim 11, wherein the clamp has a convex shape, with an upper portion of the clamp being swollen upward from an outer periphery to an inner periphery of the clamp, and wherein a vertical height between an upper end portion of the clamp and a surface of the pressing portion, to be contacted with the disk, becomes reduced when the clamp is deformed.

16. The disk drive of claim 11, wherein the engaging element comprises a ring shaped portion along an outer periphery of the hub at an upper end of the hub.

17. The disk drive of claim 11, wherein the hook and the pressing portion are ring shaped along inner and outer peripheries of the clamp, respectively.

* * * * *

UNITED STATES PATENT AND TRADEMARK OFFICE
CERTIFICATE OF CORRECTION

PATENT NO. : 7,589,935 B2
APPLICATION NO. : 10/997988
DATED : September 15, 2009
INVENTOR(S) : Myung-il Kim It is certified that error appears in the above-identified patent and that said Letters Patent is hereby corrected as shown below:

Column 8, Line 24, change "A" to --a--.

Signed and Sealed this

First Day of December, 2009

David J. Kappos
*Director of the United States Patent and Trademark Office*